April 23, 1968 J. A. GROSEMANS 3,379,071

MECHANISM FOR VARYING THE SPEED OF THE TURNTABLE OF A RECORD PLAYER

Filed Oct. 1, 1965 2 Sheets-Sheet 1

INVENTOR.
JOZEF A. GROSEMANS

BY

Frank R. Jufari

AGENT

INVENTOR.
JOZEF A. GROSEMANS
BY
Frank R. Trifari
AGENT

United States Patent Office 3,379,071
Patented Apr. 23, 1968

3,379,071
MECHANISM FOR VARYING THE SPEED OF THE TURNTABLE OF A RECORD PLAYER

Jozef Antoon Grosemans, Emmasingel, Eindhoven, Netherlands, assignor to North American Philips Company, Inc., New York, N.Y., a corporation of Delaware Filed Oct. 1, 1965, Ser. No. 492,184
Claims priority, application Netherlands, Oct. 24, 1964, 64—12,421
3 Claims. (Cl. 74—194)

ABSTRACT OF THE DISCLOSURE

A compact speed changer mechanism for record players which will operate by linear movement of an actuator. A lever is mounted on the record player frame, an idler wheel is mounted on the lever and engages a stepped driving shaft and the turntable. The actuator engages the lever and a saw-toothed aperture in the frame. Movement of the actuator moves the idler wheel axially along the stepped shaft and also pivots the idler wheel out of contact with the shaft during movement between steps.

The invention relates to a mechanism for varying the speed of a turntable of a record player, having a motor with a stepped driving shaft, a friction wheel, freely rotatable on another shaft and coupling said stepped shaft and said turntable.

The known mechanisms for varying the speed of a turntable are complicated due to the number of components which are sensitive to disturbances and are expensive.

The invention has for its object to provide a simple, reliable and inexpensive speed change mechanism for a record player.

A presently preferred embodiment of the invention will be described with reference to the accompanying drawing.

Figure 1:
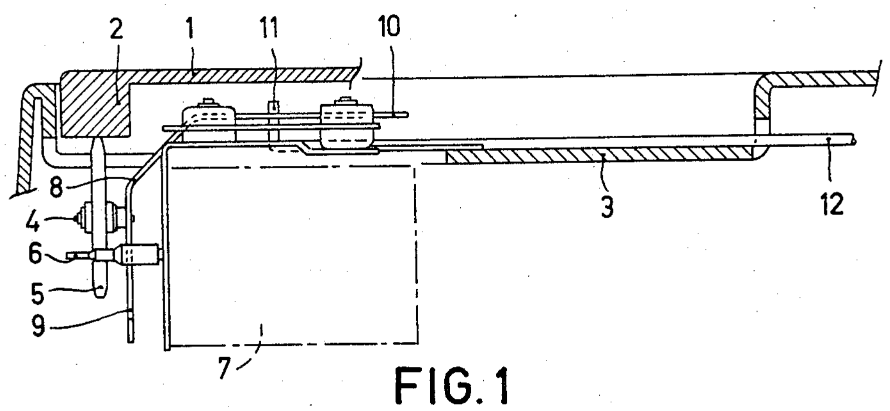
FIG. 1 shows a partial cross-sectional view of the turntable of a record player comprising a speed change mechanism according to the invention in a side elevation.

A turntable 1, provided with a broad flange 2, is rotatably supported in the frame 3 of the record player in the known manner (not shown) and can be driven by a friction wheel 5, which is freely rotatable on a shaft 4, and which is arranged in a plane at right angles to the plane of the turntable. The friction wheel cooperates with the lower edge of the flange 2 of the turntable, and is driven by contact with one of the steps of the shaft 6 of an electric motor 7. In the embodiment shown, the motor shaft 6 has three different diameters for driving the turntable 1 at three different speeds.

In order to change the speed of the turntable there is provided a single, bent-over, plate-shaped lever 8, which consists substantially of two orthogonal limbs 9, 10. In the limb 9, which is located in a plane at right angles to the plane of the turntable, the shaft 4 of the friction wheel 5 is supported. The limb 10, located in a plane parallel to the turntable, is pivotally supported on a pin 11, which is formed by a right angle bend in the end of an actuating rod 12, projecting outside the frame of the record player. By actuating the rod 12, the pin 11 can be displaced against the action of a spring 13 (FIG. 2) is a slot 14 in the frame 3. The slot 14 is provided with sawtooth-like recesses 15, the positions and inclinations of which are chosen, with respect to the center line of the motor shaft, so that by displacing the pin 11 and hence the lever 8, the friction wheel 5 is both shifted axially of the stepped motor shaft 6 and is also lifted by teeth 15 (both movements being in the plane of FIG. 2). A tensile spring 16 (FIG. 3), is secured at one end to the frame 3 and the other end is fastened to an extension 17 of the limb 9. The spring 16 ensures that the friction wheel is urged with a suitable force against the motor shaft.

Figure 2:
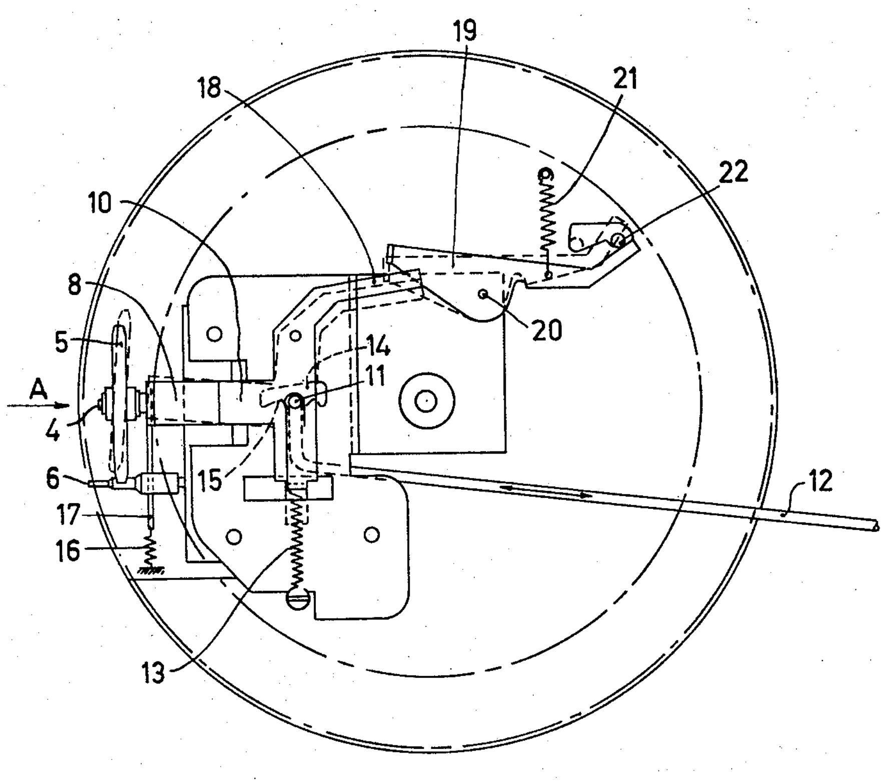
FIG. 2 is a plan view of the speed change mechanism shown in FIG. 1.
Figure 3:
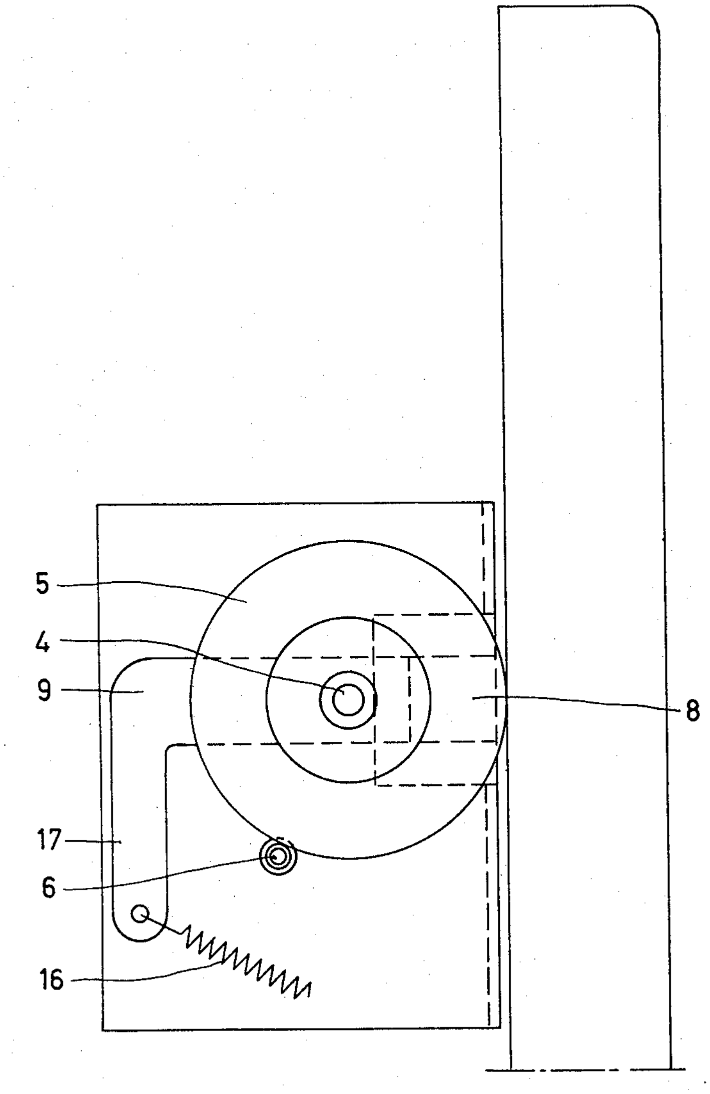
FIG. 3 shows on an enlarged scale, part of the speed change mechanism looking in the direction of the arrow A in FIG. 2.

As will be seen from FIG. 2, the limb 10 of the lever 8, is also provided with an extension 18, which projects to the rear, viewed from the friction wheel, and which bears against a stop 19, provided on the frame. When the friction wheel is shifted (to the right in the drawing, FIG. 2) by actuating rod 12, extension 18 and cooperating pivotal stop lever 19 cause lever 8 to tilt (also in the plane of FIG. 2) about the pin 11, which moves the wheel 5 as shown in phantom in FIG. 2, i.e., wheel 5 is canted for proper tracking and thus reduces wear.

Preferably, the stop lever 19 which is rotatable about the pin 20 supported in the frame, is movable under the action of a spring 21. Adjustment of stop lever 19 insures that the friction wheel is clear of the motor shaft. The means for adjusting the stop lever 19, shown diagrammatically and designated by 22, are not essential to invention so that further description thereof is not included for brevity.

It should be noted that the lever 8 may be made up of a plurality of parts, if it would be desired for example for reasons of manufacture.

The invention is not restricted to the so-called bottom drive, as described above and illustrated in the drawing; it may also be applied to a peripheral drive in which case the friction wheel is arranged in a position turned through 90°, so that it can cooperate in a horizontal plane either internally or externally with the rim of the turntable.

What is claimed to be new and useful and secured by Letters Patent of the United States is:

1. A speed changing mechanism for a record player comprising: a frame having a saw-toothed aperture therein; a motor mounted on said frame; a stepped driving shaft on said motor positioned in a plane parallel to the plane of the record player turntable; a slidable actuator adjacent said frame, said actuator having a pin thereon passing through said saw-toothed aperture and engaging said saw-teeth, said saw-teeth corresponding to the steps on said stepped shaft; a lever including first and second limbs pivotally mounted on said pin, said first limb being positioned normal to the plane of said turntable and said second limb being positioned parallel to the plane of said turntable, said pin engaging said lever in the plane of said second limb; an idler wheel rotatably mounted on said first limb and drivably interconnecting said driving shaft and said turntable; first means engaging said lever for biasing said idler wheel into contact with said turntable and said driving shaft; second means interconnecting said lever and said frame for normally biasing said pin in contact with said saw-teeth; whereby linear movement of said actuator moves said pin over said saw-teeth thereby tilting said idler wheel out of contact with said driving shaft and moving said idler wheel axially along said steps of said driving shaft.

2. A speed changing mechanism for a record player according to claim 1 wherein said lever further comprises an extension normally engaging said second limb in a plane parallel to said turntable, and said lever tilting means comprises a pivotal stop lever mounted on said frame engaging said extension and a biasing member normally biasing said pivotal stop lever into contact with said extension.

3. A speed changing mechanism according to claim 2 wherein said pivotal stop lever includes means for tilting said lever through an angle around said pin proportional to the axial movement of said idler wheel along said stepped shaft thereby positioning said idler wheel in a canted position with respect to said turntable that differs for each step of said driving shaft.

References Cited

UNITED STATES PATENTS

| | | | |
|---|---|---|---|
| 2,847,862 | 8/1958 | Tatter | 74—190 |
| 2,884,795 | 5/1959 | Coven | 74—194 |
| 2,925,737 | 2/1960 | Hartman | 74—190 |
| 3,160,022 | 12/1964 | Dvorin | 74—190 |

FRED C. MATTERN, Jr., *Primary Examiner.*

C. J. HUSAR, *Assistant Examiner.*